(12) United States Patent
Raghoebardajal et al.

(10) Patent No.: US 12,363,318 B2
(45) Date of Patent: Jul. 15, 2025

(54) VIRTUAL REALITY STREAMING SYSTEM AND METHOD

(71) Applicant: Sony Interactive Entertainment Inc., Tokyo (JP)

(72) Inventors: Sharwin Winesh Raghoebardajal, London (GB); Jose Rubio, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/513,839

(22) Filed: Nov. 20, 2023

(65) Prior Publication Data

US 2024/0179327 A1 May 30, 2024

(30) Foreign Application Priority Data

Nov. 30, 2022 (GB) ...................................... 2217975

(51) Int. Cl.
| | |
|---|---|
| H04N 7/12 | (2006.01) |
| G01P 15/02 | (2013.01) |
| H04N 19/167 | (2014.01) |
| H04N 19/46 | (2014.01) |

(52) U.S. Cl.
CPC ........... *H04N 19/167* (2014.11); *G01P 15/02* (2013.01); *H04N 19/46* (2014.11)

(58) Field of Classification Search
CPC .................................................. H04N 19/167
See application file for complete search history.

(56) References Cited

U.S. PATENT DOCUMENTS

| | | |
|---|---|---|
| 2018/0077210 A1 | 3/2018 | Hannuksela |
| 2018/0089903 A1 | 3/2018 | Pang |
| 2019/0052870 A1 | 2/2019 | Lutter |

FOREIGN PATENT DOCUMENTS

| | | |
|---|---|---|
| WO | 2017200721 A1 | 11/2017 |
| WO | 2019209588 A1 | 10/2019 |

OTHER PUBLICATIONS

Combined Search and Examination Report for corresponding GB Application No. 2217975.8, 8 pages, dated May 30, 2023.

*Primary Examiner* — Y Lee
(74) *Attorney, Agent, or Firm* — Kilpatrick Townsend & Stockton LLP

(57) ABSTRACT

Methods and apparatus provide for capturing with a camera a wide field of view image having a field of view that is wider than a field of view subsequently displayed to the recipient, capturing at least orientation information of the camera as extrinsic camera parameters, and streaming successive images along with corresponding extrinsic camera parameters. Alternative provisions include receiving a stream comprising successive wide field of view images captured by a camera, and at least corresponding orientation information of the camera, receiving indications of at least an orientation of a head mounted display 'HMD' having a field of view smaller than the wide field of view images, aligning a respective predetermined main area of interest in the received images with a viewpoint corresponding at least to a predetermined orientation of the HMD, and displaying the result on the HMD, based on at least the received orientation information of the camera and the indicated orientation of the HMD.

18 Claims, 3 Drawing Sheets

VIRTUAL REALITY STREAMING SYSTEM AND METHOD

BACKGROUND OF THE INVENTION

Field of the Invention

The present invention relates to virtual reality streaming.

Description of the Prior Art

With the advent of ubiquitous fast internet connectivity, video streaming as a form of communication has become increasingly popular. Such streaming takes several forms, such as streaming by individuals to one or many recipients on social media platforms (typically live but also as recordings of live streams), or engaging in video calls or group chats between friends, family or colleagues.

The benefit of video streaming is to provide the recipient(s) with either a clear view of their correspondent, or the viewpoint of the correspondent, depending on the purpose of the stream. In either case this provides a more immersive experience for the recipient(s).

In conjunction with developments in video streaming, recently there has been significant developments in virtual reality 'VR', with headsets becoming more accessible and commonplace. The use of VR could further improve the immersive experience of streaming.

The present invention seeks to address this need.

SUMMARY OF THE INVENTION

Various aspects and features of the present invention are defined in the appended claims and within the text of the accompanying description.

In a first aspect, a transmitting virtual reality streaming system is provided in accordance with claim 1.

In another aspect, a receiving virtual reality streaming system is provided in accordance with claim 13.

In another aspect, a transmitting and receiving virtual reality streaming system is provided in accordance with claim 15.

In another aspect, a method of transmitting a virtual reality stream is provided in accordance with claim 16.

In another aspect, a method of receiving a virtual reality stream is provided in accordance with claim 17.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A virtual reality streaming system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
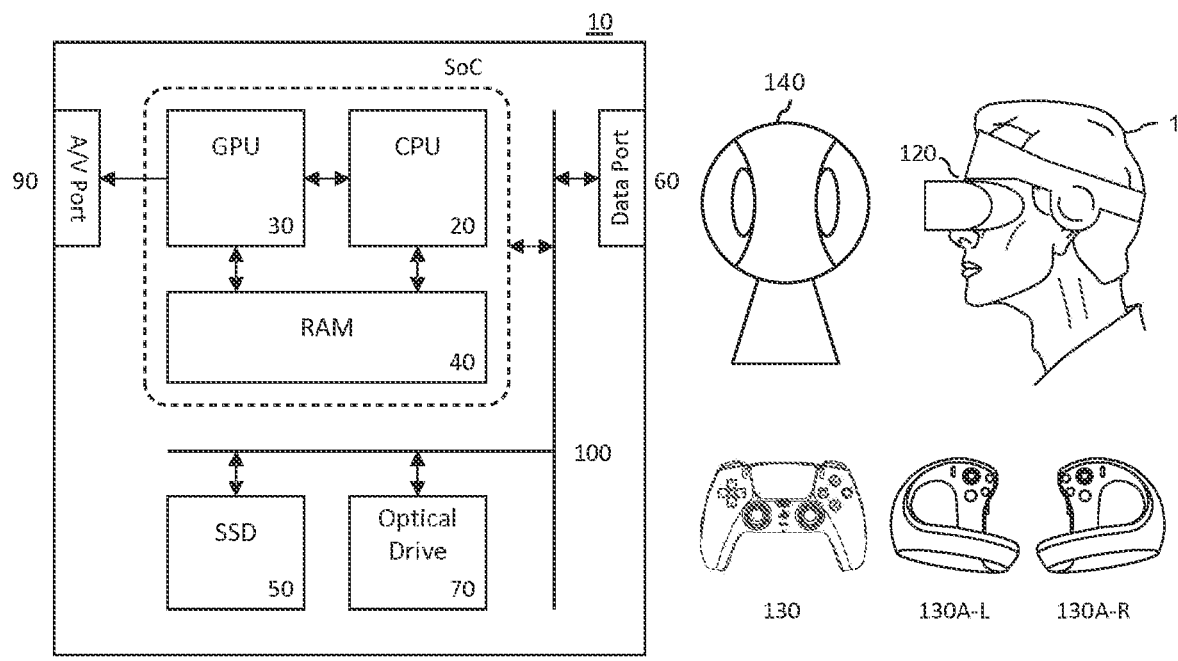
FIG. 1 is a schematic diagram of a virtual reality streaming system in accordance with embodiments of the present description.

Referring now to the drawings, wherein like reference numerals designate identical or corresponding parts throughout the several views, FIG. 1 shows an example of a VR streaming system 10 in the form of a computer or console such as the Sony® PlayStation 5® (PS5).

The streaming system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, Wi-Fi® port, Bluetooth® port or similar, as appropriate. It may also optionally receive data via an optical drive 70.

Audio/visual outputs from the entertainment device are typically provided through one or more A/V ports 90, or through one or more of the wired or wireless data ports 60.

An example of a device for displaying images output by the entertainment system is a head mounted display 'HMD' 120, such as the PlayStation VR 2 'PSVR2', worn by a user 1.

Audio/visual inputs to the entertainment device are similarly typically provided through one or more A/V ports 90, or through one or more of the wired or wireless data ports 60.

An example of a device for capturing images and optionally audio for input to the entertainment system is a wide field of view camera 140.

Where components are not integrated, they may be connected as appropriate either by a dedicated data link or via a bus 100.

Interaction with the system is typically provided using one or more handheld controllers (130, 130A), such as the DualSense® controller (130) in the case of the PS5, and/or one or more VR controllers (130A-L,R) in the case of the HMD.

The system in FIG. 1 illustrates peripherals both for image capture (e.g. camera 140) and image display (e.g. HMD 120), enabling such a system to both send and receive, for example in the case of a two-way video chat. However it will be appreciated that for a one-way live stream or similar live or recorded broadcast, only an image capture peripheral is required by the streaming source whilst only an image display peripheral is required by the recipient.

Figure 2:
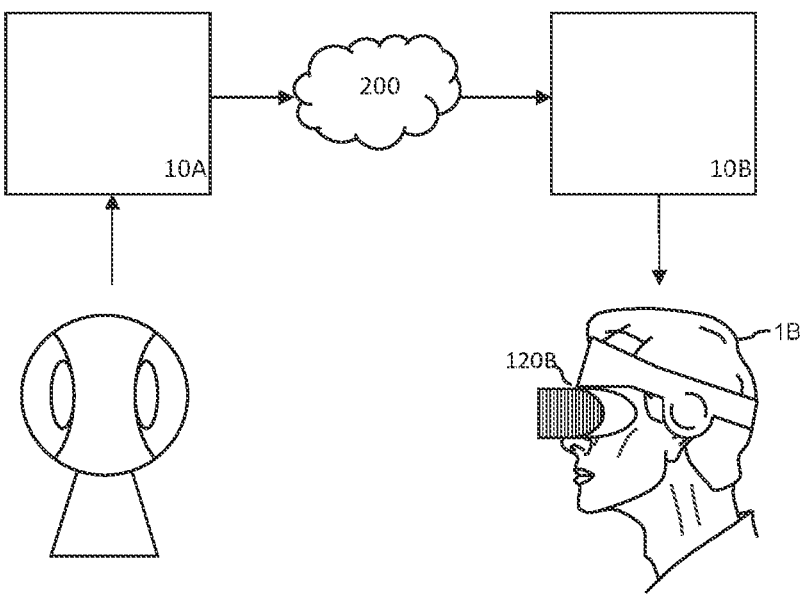
FIG. 2 is a schematic diagram of a pair of virtual reality streaming systems in accordance with embodiments of the present description.

For simplicity of explanation, such a one-way communication is illustrated in FIG. 2, but it will be appreciated that two way communication would simply add the reverse arrangement to this illustration.

In FIG. 2, a wide field of view image is captured by the wide field of view camera 140. In embodiments of the description, a wide field of view may be defined as a field of view that is wider than the field of view subsequently displayed to the recipient. As will be described later on, this allows the recipient to look around within the available field of view being streamed.

The wide field of view may, as non-limiting examples, be 110 degrees, 140 degrees, 180 degrees, 270 degrees or 360 degrees, or any angle in between depending on the optics of the individual camera or cameras used within the wide field of view camera. For example the camera may comprise a single 110°, 140°, or 180° lens such as a fisheye lens, or may comprise four 110° or 140° lenses, or three 140° lenses, or two or three 180° lenses, with overlapping fields of view, to capture up to a 360° field of view. It will be appreciated that each lens has an associated camera sensor and so the wide field of view camera may itself effectively comprise multiple contributing cameras.

The wide field of view camera in FIG. 2 is illustrated, as a non-limiting example, as having two 180° fisheye lenses/cameras to provide a 360° field of view.

Optionally to provide a stereoscopic image, the camera or cameras may be depth cameras, i.e. comprise a depth measurement mechanism such as a structured light projector to gauge the corresponding depth of pixels in the captured image (typically at a lower resolution than the image itself). Structured light works by illuminating the scene e.g. with a grid, and the scale and distortion of the grid in the scene corresponds to depth. This can be done for example in near-infra-red, which is invisible to the user but can be captured by most charge coupled devices uses as camera sensors. The grid can be flashed in between frames used for transmission so that the grid does not appear in the transmitted stream.

Alternatively or in addition, the wide field of view camera itself may be stereoscopic and comprise one or more pairs of cameras mounted at a typical inter-pupillary distance from each other or, to be more compact, at a shorter distance. Alternatively a relatively wide inter-pupilary distance may be used, allowing for a digital re-compositing of the stereo image for the recipient's own inter-pupillary distance by the receiver.

Hence for example a 180° stereoscopic wide field of view camera may be provided by using two 180° fisheye lenses (or similar) suitably spaced apart according to one of the options above.

In one option, this principle is extended to cameras that are not on the same horizontal plane; for a wide field of view camera with multiple cameras pointing in different directions but having overlapping fields of view, the cameras can be treated as stereoscopic pairs where their fields of view overlap. Hence for example for four 180° cameras A, B, C, D each positioned 90° from each other, cameras AB, BC, CD, and DA can be treated as stereoscopic pairs for the respective 90° segments that they overlap.

Alternatively or in addition, a stereoscopic image can be generated from a monoscopic image either by the transmitting VR streaming system or the receiving VR streaming system, using a machine learning 'ML' model that has been used to predict a second image with a typical inter-pupilary stereo offset by being trained with a left or right image as the input and a corresponding right or left image as the target, for example using conventional stereoscopic video images. Optionally, to make use of more information, the input to the ML model may also comprise one or more earlier frames (for example the immediately preceding frame, or a frame from N frames ago where N is for example 2, 3, 4, 5, 10, 24, 25, 30, or any suitable number.

Such a model may be trained on typical scenes—for example one person occupying the majority of a central view for a video chat. For a wide field of view camera comprising multiple cameras, different models may be used for the different views, for example to more accurately predict faces in one input stream and backgrounds in another.

In any event, a view field of view image, as either a single captured image or a composite image from multiple cameras, is captured by the wide field of view camera. This image may be monoscopic or stereoscopic. The wide field of view camera may also comprise a microphone to capture audio, and/or this may be captured separately.

The video and optionally audio is then received by the virtual reality streaming system 10A.

Streaming this video via a network 200 such as the internet to a recipient virtual reality streaming system 10B would therefore provide the recipient 1B with a wide field of view image that they could look around in using HMD 120B.

However, there are some problems with this arrangement. Firstly, a wide field of view has a corresponding large transmission bandwidth. This may be difficult to efficiently encode if it is unknown where the recipient user might subsequently look within the received image. Secondly, for some live streams the camera may be portable (for example mounted on a skier, or a racing car, or held by a rock star on stage, or a viewer in their audience). Consequently, and unlike normal viewing of live streams, the motion of the transmitting user may cause nausea in the subsequent viewer.

Figure 3:
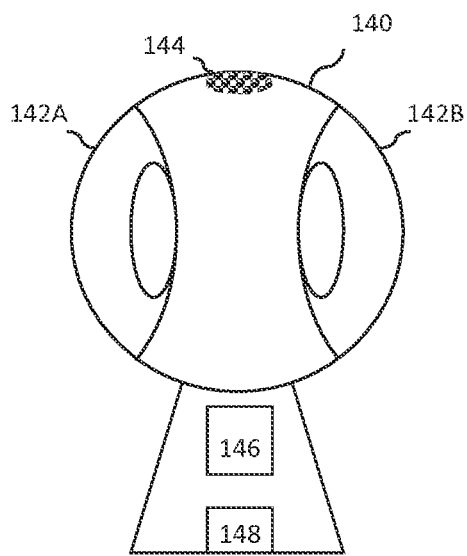
FIG. 3 is a schematic diagram of a wide field of view camera in accordance with embodiments of the present description.

Turning now to FIG. 3, in embodiments of the present description these problems may be addressed as follows.

FIG. 3 illustrates wide field of view camera 140 in more detail. As noted elsewhere herein the camera may optionally comprise one or more microphones 144, and one or more cameras 142A,B providing the a field of view wider than the field of view of the recipient viewing device. The camera also comprises an output 148 that may be wired or wireless. The output may connect either directly to the streaming system 10 (for example via a cable or a directly wireless protocol such as Bluetooth® or WiFi® Direct), or indirectly via a cable (for example Ethernet) or wireless (e.g. WiFi®) to a network, and send its data to the transmitting streaming system.

In addition, the wide field of view camera comprises a status monitor 146. In embodiments of the description, this status monitor comprises an inertial measurement unit 'IMU' such as for example one or more accelerometers (for example in a three axis configuration) to detect motion of the camera and typically also rotation in each axis. Alternatively or in addition to accelerometers, one or more gyroscopes may be used, and/or a 'SLAM' (simultaneous localisation and mapping) scheme may be used based on images from one or more of the cameras, although this typically only identifies relative movement, and not absolute position.

In this way, the position and orientation of the wide field of view camera (e.g. camera extrinsic parameters) may be measured during use. Typically the absolute orientation of the camera may be determined using one or more accelerometers/gyroscopes, and the relative position (and optionally orientation) over time using one or more accelerometers/gyroscopes/SLAM.

The status monitor may also comprise data relating to the lenses/cameras of the wide field of view camera. This information may comprise transform and distortion data characterising how the lenses serve to map the real scene to the captured image, and similar camera intrinsic parameters such as the relative position of the optical centre at the focal length of each camera.

In this way both extrinsic parameters may be captured at the same time as the camera images and provided, optionally together with the intrinsic parameters, to the transmitting VR streaming system 10A.

Typically the intrinsic parameters are constant (although optionally focal length may change if the camera has an autofocus function, and similarly the field of view may change if the camera has a zoom function).

Meanwhile the extrinsic parameters may be variable, particularly if the wide field of view camera is handheld, or mounted on a vehicle, but even if notionally statically mounted on a desk that may occasionally be knocked, or where the camera is moved out of the way when not in use and repositioned for use potentially slightly differently each time.

Accordingly, the VR streaming system 10A receives the intrinsic parameters at least once (for example when first connected to the camera), and optionally may receive them again if any of the parameters change (due for example to a change of focus or zoom, or if the device receives a knock, or other environmental change that may affect intrinsic, such as temperature, as described elsewhere herein). Similarly any other static information about the originating camera (e.g. information about the sensors, or the make/model of the camera) may be included once.

Meanwhile the VR streaming system 10A receives the extrinsic parameters corresponding to the current captured image (or set of images for use in a composite image). For multiple cameras (including left and right stereoscopic cameras, and/or cameras pointing in different directions around the wide field of view camera), the extrinsic parameters may be different for each camera. This may be for example because the camera is moved in an arcuate or rotational manner that is not perfectly centred in the middle of the camera and so the rate of turn for the individual cameras is different; for example a small adjustment to the camera that happens to rotate around the position of one camera will cause that camera to rotate with no translation, whilst the or each other camera both rotates and translates.

The inertial measurement unit of the status monitor can have a known physical relationship with the or each camera within the wide field of view camera, and hence compute the effective extrinsic parameters for each camera.

Alternatively or in addition, to reduce the computational burden of the wide field of view camera, these physical relationships may be provided to the transmitting VR streaming system 10A, either by the camera itself or as part of an associated driver software package, and then the streaming system itself can compute the effective extrinsic parameters for each camera based upon the extrinsic parameters captured by the IMU. As explained later herein alternatively or in addition, this computation can be performed by the recipient streaming system 10B.

The transmitting streaming system 10A receives the image data and the extrinsic data from the wide field of view camera 140 and optionally the intrinsic camera data as required, as described elsewhere herein.

The transmitting VR streaming system 10A then formats the image data, extrinsic data, and optionally the intrinsic data for streaming.

Typically the VR streaming system formats the image data as a single image for streaming. In this case 'a single image' may be a single monoscopic image or a single stereoscopic image pair, as appropriate. Where the image (or left and/or right image) is a composite image derived from multiple cameras, any regions of overlap can be used to stitch together the images into a composite image, and optionally use an averaging or blending scheme to transition from pixel data of one camera to pixel data of the other. This can help to remove any visible discontinuities between the cameras in terms of lighting or colour balance; for example even if the camera sensors are identical, different surfaces of the camera may accumulate different levels of dust or fingerprints or be exposed to different lighting that results in an overall different quality of image. Optionally alternatively or in addition to averaging or blending, the images may be normalised for brightness, but this carries the risk that if there is genuine difference in lighting between the different views of the cameras, this is may be suppressed by such process.

The transmitting VR streaming system may compress the image data by accounting for one or more factors. Firstly, the system may assume that a notionally front camera of the wide field of view camera is the main camera, and furthermore that a centre region of this camera is the main area of interest.

More generally, there can be assumed to be an intended area of interest within the captured image that should be given preferential treatment during compression (i.e. retain the highest quality). The transmitting VR streaming system may then use the intrinsic properties of the wider field of view camera (or at least the camera comprising the main area of interest) to determine how the pixels in the distorted image will map to a view within the recipient HMD when looking at the main area of interest; for example which parts of the image will be at the periphery of the HMD, and which parts of the image will be outside the field of view of the HMD. The compression of the image may then optionally follow a similar compression scheme to so-called foveated image compression where the image quality due to compression successively drops for regions of the image further away from the main area of interest as computed using the intrinsics of the or each camera.

For other parts of the image (or composite image) for example captured by other cameras that do not encompass the presumed main area of interest, they may also be compressed to a higher degree.

The amount of compression is likely to be determined by the available bandwidth during transmission, or a bandwidth limit set by a host service. When using a foveated image compression scheme based on an assumed main area of interest, then either the main area of interest can be expanded to use up a bandwidth limit, and/or the quality of compressed image in an area around the main area of interest can be increased, and/or the rate of drop-off in quality of compressed image outside the area of main interest can be reduced, to reach the bandwidth limit.

Alternatively or in addition another factor that may be used when setting the degree of compression is the view distance in VR; objects close to the camera (and hence receiving user) in VR may be compressed to retain a higher image quality than features of the scene further away. This may apply whether the objects are in the assumed main area of interest or whether they are in other parts of the scene; this means that if the receiving user looks around, then objects that may invite close inspection will be at a higher quality than the background. When used in conjunction with a foveated image compression scheme or similar, then as elements of the scene are compressed to progressively lower qualities away from the main area of interest, objects that are close to the camera but away from the main area of interest may be compressed to a proportionally better quality.

Figure 4:
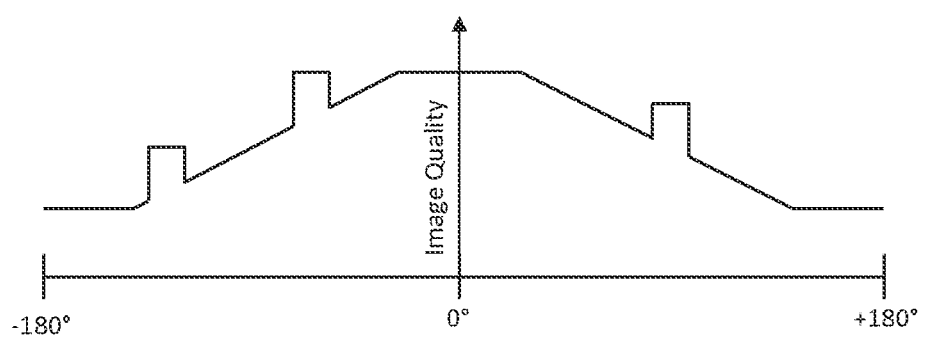
FIG. 4 is a schematic diagram of relative image quality using an encoding scheme in accordance with embodiments of the present description.

Referring now to FIG. 4, this illustrates both approaches to compression. For a 360° composite image, the main area of interest is assumed to be centred on the front camera at 0° represented by the flat region of highest image quality centred on this position. Subsequent to the image quality ramps down on either side of this area—optionally for example to an extent responsive to the intrinsics of the camera and how these will map to the field of view of the viewing device—but where objects are within a threshold distance of the camera/user are detected then optionally these retain a higher image quality than the surrounding background area. However in this case optionally the higher image quality is relative to the image quality for the location relative to the area of interest, as shown in the Figure.

It will be appreciated that the size of the area of interest, the use of a continuous downward sloping quality, the relative increase in quality for the close objects, and the relative lowest quality of image implied by this figure are all non-limiting examples. Hence for example the drop in quality may be stepwise or a mixture of stepped and sloped, and may change step or slope for example at one or more of a point corresponding to the field of view of the HMD if centred upon the main area of interest, the field of view of the first camera comprising the main area of interest, the field of view of an average user having turned their head to the left or the right to a comfortable extent, and the field of view of an average user having turned their head and shoulders to the left or right to a comfortable extent.

Whilst the area of interest has been assumed to be centred upon the notional front camera of the wider field of view camera, optionally it may be centred upon a person detected within the captured image; a user recording a stream may not sit directly in front of the camera but may be off to one side, for example. Where there are two or more people within the captured image, then there may be two or more main areas of interest, with an associated stepwise and that or sloping change in image quality radiating out for each such area. Optionally in this case if one person is in the foreground and the other is in the background, then the second person may be treated as background and not be the subject of a secondary main area of interest; in this case foreground and background distances may be a function of one or more predetermined thresholds.

Once the or each image has been compressed according to the streaming scheme and optionally responsive to one or more of the above compression factors, the transmitting VR streaming system 10A then transmits the or each image as part of a stream.

Preferably the stream is a conventionally formatted stream that may be handled by common social media platforms and video hosting websites. Notably such conventional stream formats do not provide for IMU and other such status data.

Hence in embodiments of the present description, the extrinsic data such as the position/orientation IMU data discussed elsewhere herein, and optionally the intrinsic data if and as required, is included in a user data field of the stream format. Typically the extrinsic data is transmitted on a per frame basis together with the streamed image in its frame. Optionally the extrinsic data may comprise separate extrinsic data for respective parts of a composite image that came from different cameras, as these may experience different changes in position and location as described elsewhere herein.

If the user data field available in the stream format is insufficient for this data, then optionally the position/orientation data may be quantised according to a predetermined quantisation scheme to fit the number of bits available in the user data field. Similarly if the user data field available in the stream format is insufficient for this data, then optionally where the extrinsic data from the IMU/status monitor comprises different data for different respective parts of the composite image or equivalently data for the respective cameras, then optionally the IMU data for the status monitor alone may be transmitted, and the receiving VR streaming system, making use of the known relationships between the status monitor and the or each camera can compute the extrinsic data locally.

If the user data field is still too small, or the streaming format does not comprise a user data field, or the user data field is necessary for other data, or for any other suitable reason, then optionally the extrinsic data and optionally if and as needed the intrinsic data may be hidden as part of the image data.

In an embodiment of the present description, it can be hidden as one or more lines of the image itself, for example the top line or lines, or a part thereof. For a typical HD image, one line provides 1920×3×8=46 k bits of data, which is likely to be more than enough space for the position, orientation an optionally other data described herein.

Consequently optionally if for example 1920 bits per frame was sufficient, then a single bit within one colour channel of the line could be used. For example the lowest significant bit, or the lowest bit preserved by the streaming process (or preserved by a target streaming host service) could be used to encode the data with minimal impact on the image quality.

Similarly any other bits or flags within the image encoding of the streaming scheme that are currently unassigned and sufficient to transmit the desired data may be used. For example an unused flag associated with a plurality of macroblocks or motion vectors within all or part of the image may be sufficient to encode the data.

As noted elsewhere herein, the data will typically comprise extrinsic data such as the position and orientation of the wider field of view camera, and optionally either indication that the main area of interest is centred within the image, or an indication of where the main area of interest is located in the image; optionally intrinsic data relating to the optical properties of the or each camera, and optionally any changes in this intrinsic data. It will be appreciated that this optional data need not necessarily be transmitted with every frame but may be included in an initial header or only in particular frames such as in I-frame or data associated with a group of pictures 'GOP'.

In this way, the extrinsic and optionally intrinsic data associated with the wide field of view camera image can be streamed in a manner that is transparent to, and robust to, a streaming scheme such as those provided by streaming services and hosts. It will be appreciated that some services and hosts provide streams at multiple quality levels; if so then optionally the additional data described herein may only be preserved at or above a threshold quality (for example an 'HD' or 'high' quality).

Whilst the description herein has referred to the wide field of view camera as being separate to the transmitting VR streaming system (itself for example being a PlayStation videogame console), in principle the wide field of view camera may comprise the transmitting VR streaming system, for example as a dedicated system on a chip implementing the functions described herein as required.

In summary, the wide field of view camera 140 comprises one or more cameras 142A,B to capture an image (a single or composite image, monoscopic or stereoscopic) that has a wider field of view than that of the eventual recipient display device 120B.

In addition, the wide field of view camera comprises a status monitor 146 to capture IMU data such as position and orientation of the wide field of view camera.

Optionally, compositing the images may be done either by the wide field of view camera or the transmitting VR streaming system.

Optionally, where the wide field of view camera comprises multiple cameras, the extrinsics of each camera may be computed by the wide field of view camera or the transmitting VR streaming system, or by the receiving VR streaming system.

Optionally the intrinsics of the wide field of view camera may be known to the transmitting VR streaming system, in which case they do not need to be provided by the wide field of view camera.

Optionally the intrinsics of the wide field of view camera may be known to the receiving VR streaming system, in which case they do not need to be provided by the transmitting VR streaming system.

However, if the intrinsics can change, then this information can be provide by the wide field of view camera to the transmitting VR streaming system and thereon to the receiving VR streaming system. Alternatively, if the changes are due to commands from the transmitting VR streaming system, then optionally the changes may be assumed by the transmitting VR streaming system and the wide field of view camera does not need the ability to report these.

The transmitting VR streaming system then formats the image (for example in an image frame) as part of a conventionally formatted vide stream that is supported by a known streaming service, so as to provide transparency and backward compatibility with at least a first target streaming service or host.

The compression of the images may assume a main area of interest centred on a notional front camera of the wide field of view camera, and compress the image optionally based upon the intrinsics of the camera according to how it's image map onto the viewing device of the recipient (e.g. the HMD), and/or the distance from the notional main area of interest, and/or responsive to the relative distance of objects within the image from the camera.

The transmitting VR streaming system includes at least the extrinsic information (position and orientation) as captured with the image data of the current frame in a manner that survives the streaming format/host processing. This may be within a user data field, or where this is undesirable (for example if too small, needed for some other data, or likely to be stripped out by a hosting service) then the data may be embedded within the image, for example as a line in the image, or as a bit within such a line (for example the least significant bit in at least one colour or luminance channel unaffected by the streaming encoding/host processing for at least one quality setting).

In this way, both the image data and the position and orientation of the wide field of view camera will be accessible to the receiving VR streaming system, either as part of a direct live stream or when accessing a live or recorded stream from streaming host.

The receiving VR streaming system 10B receives the stream either as part of a live one-to-one or one to many broadcast or as part of a recorded stream from a streaming host.

As discussed later herein, the receiving VR streaming system extracts at least part of the received image together with the extrinsics data and optionally some or all of the optional data.

The receiving VR streaming system also receives information from the HMD indicating its orientation and optionally position, as a proxy for the user's current viewing direction. The receiving VR streaming system may also establish a presumed resting and front facing position and orientation for the user, which may be considered the default viewpoint for the user. This may be established for example as an average position amongst all positions used by the user or amongst all positions associated with small movements by the user, and/or may be the position in which the user stay substantially still for the longest period of time. This average or resting position may also be determined during a usage session only for a subset of activities, such as interactions with a user interface such as a menu, that are relatively passive and unlikely to have been influenced by off-screen events or sudden shocks or changes in content, as may be associated with playing a video game. Optionally the user can be asked to simply adopt a comfortable forward facing position to view content, and provide an indication for example through the controller or vocally when they are comfortable.

The receiving VR streaming system may then optionally rotate the position/orientation coordinates of either the received stream or the HMD to align the centre of the user's comfortable front facing viewpoint with the centre of the main area of interest of the received streamed content. Hence for example even if the transmitting user was sat off centre within the original transmitted image, they will now be displayed to the receiving user directly in front of them when viewing comfortably. Optionally, if the off centre positioning was a deliberate artistic or utilitarian decision (for example in order to allow space for explanatory diagrams or to show other information), then a flag may be provided to override this function and orient the HMD to the centre of the notional front camera even if this is not within the main area of interest, so that the user needs to look in a specific direction to centre their view on the main area of interest.

In any event, the receiving VR streaming system may optionally only extract from the received image that portion of the image required to fill the field of view of the display device (e.g. the HMD). Typical HMDs have a field of view of 90 to 110°, and although this may increase over time the general principle that the wide field of view camera will have a wider field of view than the HMD will continue to apply and so only a subsection of the captured image needs to be extracted for display to the HMD.

In this way, typically the receiving user can view the content on the HMD automatically centred on the main area of interest (unless specifically overridden by the content creator), and subsequently look around the scene by moving their head to change the field of view of the HMD, to the extent permissible by the width of the wide field of view camera. Optionally, if the wide field of view camera is not a 360° camera, then if the user turns their head to such an extent that the field of view of the HMD moves outside the field of view of the wide field of view camera, the missing region is filled in for example with a black space so that the user is aware they have moved outside the available field of view, but the portion of the image display to them still moves responsive to their head so that they are not exposed to a sudden jarring lock by stopping the movement of the image once the edge is reached.

Optionally the receiving VR streaming system may extract the intrinsic information from the stream, if it was included and required. The intrinsic information will assist the VR streaming system with mapping the image onto the HMD headset; any distortion within the image (for example due to the fisheye lens) can be corrected, and subsequent distortion (for example to counteract image distortion by the lenses within the HMD itself) can be applied. It will be appreciated that in principle the combined change in distortion can be computed and these corrections can be applied in a single step.

If the wide-angle field of view camera is known (for example of it is a standard peripheral of the streaming system) then the intrinsic information may not be required within the stream and the receiving VR streaming system may already have the information. Conversely, if the wide-angle field of view camera is not known, or if it is able to change intrinsic parameters such as focal point or field of view, then this information may be included within the stream and access by the receiving VR streaming system.

As noted previously, for some live streams (whether broadcast directly or recorded and broadcast on demand by a host) the camera may be portable (for example mounted on a skier, or a racing car, or held by a rock star on stage, or a viewer in their audience).

Consequently, and unlike normal viewing of live streams for example on a mobile phone, the motion of the transmitting user may cause nausea in the subsequent viewer. In other words, the receiving user may be standing or sitting still, but are subjected to a viewpoint that is shaky or bouncing up and down as the transmitting user walks or runs. Such disparities between the receiving users vestibular system and what they see can cause nausea.

Accordingly, in embodiments of the present description, the receiving VR streaming system can use the extrinsic data to calculate the motion of the wide field of view camera, and compensate for it when selecting the subset of the received image to display within the field of view of the HMD.

In other words as the camera shifts up and down and/or left and right, the viewpoint of the HMD is modified to shift down and up and/or right and left to cancel the apparent motion of the camera and so stabilise the viewpoint. This can be applied in addition to actual movement of the HMD so that the movement of the original camera is cancelled whilst the movement of the HMD is included so that the user is able to look around a steady version of the image, and the risk of nausea is significantly reduced.

It will be appreciated that it is not desirable to remove all movement. Hence the cancellation of movement may be limited to that above a threshold frequency and/or below a threshold amount.

The threshold frequency should preferably correspond to that associated with walking, i.e. above a value between around 1.5 Hz and 2 Hz. Frequencies associated with running and engine vibration and the like are typically also higher than this. To determine the frequency of movement, optionally an image buffer is used by the receiving VR streaming system comprising at least enough memory to buffer $1/1.5=\frac{2}{3}$ s of streamed image data.

Alternatively or in addition, such buffering may have been performed by the transmitting VR streaming system to determine the effective frequency and/or amount of motion of the camera, and this information can be included in the extrinsic data of the image frames—hence for example a buffer of at least $\frac{2}{3}$ s of streamed image data may be used to determine for an image in the buffer if motion in the image is part of high frequency or small motion as revealed by preceding/subsequent/surrounding frames (depending on the analysis used), and indicate this within the extrinsic data. The IMU extrinsic data itself will provide an indication of the direction of such motion. The receiving VR streaming system will then know what motion, if any, in the current frame is due to high frequency or small motion and hence what to compensate for.

Optionally the transmitting VR streaming system may itself operate in a similar manner to that described above for the receiving VR streaming system to remove such motion from the image, for example by shifting the position of the assumed main area of interest in opposition to the detected high frequency or small motion. Since the HMD is aligned with this area, the image will become stable for the viewer without any additional image processing at the transmitter.

Meanwhile large and intention movements, such as panning the camera (for example when a user of an handheld camera points it at an object of interest, or when a vehicle with a mounted camera turns a corner), such movements are typically below the threshold frequency and/or larger, and hence are not compensated for by the receiving (or optionally transmitting) VR streaming system.

In this way potentially nausea inducing incidental movements of the wider field of view camera can be removed when a subsection of the received streamed image is displayed to the receiving user, and/or when the main area of interest within the screen image is defined prior to transmission. Meanwhile larger and intentional motions are still preserved.

It will be appreciated that as with the option for the wide field of view camera comprising the transmitting VR streaming system, similarly optionally the HMD may comprise the receiving VR streaming system.

Variants

Optionally the IMU of the camera can be used to force the recipient user to replicate the view or the stance of the original recording; for example if it is detected that the camera is being held in orientation outside a threshold deviation from approximately upright then this can be indicated by the extrinsic information and rather than align the comfortable default viewing position of the recipient user with the centre of the main area of interest, the recipient VR streaming system can display the image to the recipient viewer whilst preserving the direction of the main area of interest. This may mean for example when a camera is pointing down (for example when looking over a cliff when the camera is mounted in the ceiling of a music venue) the recipient user would also need to look down to see the main area of interest. Similarly if the camera was predominantly facing up.

Optionally this approach may be limited to the vertical alignment of the main area of interest and the comfortable default viewing position of the recipient user, so that the only need to look down (or up as applicable) to find the main area of interest, and not (also) left or right.

Optionally the recipient VR streaming system may comprise an image enhancement/upscaler DL filter on the centre/ focal/attention area of the image (for example using a machine learning system), as streaming/compression artefacts are most noticeable to the user in such an area. Any received information about the source camera in the stream (e.g. its make/model, details about the sensors such as pitch, and the intrinsics) may assist with the upscaling process.

SUMMARY

In a summary embodiment of the present description, a transmitting virtual reality streaming system comprises a wide field of view camera (such as camera 140) having a field of view that is wider than a field of view subsequently displayed to the recipient (for example on HMD 120), as described elsewhere herein; the wide field of view camera comprising in turn one or more contributing cameras (142A, B) and a status monitor (146), as described elsewhere herein, the status monitor comprising in turn an inertial measurement unit operable to capture at least orientation information (and optionally position information) of the camera 140 as extrinsic camera parameters, as described elsewhere herein; and a streaming encoder (e.g. CPU 20) adapted (for example by suitable software instruction) to stream successive images along with corresponding extrinsic camera parameters, as described elsewhere herein.

Instances of this summary embodiment implementing the methods and techniques described herein (for example by use of suitable software instruction) are envisaged within the scope of the application, including but not limited to that:
- the contributing camera or cameras may comprise depth cameras comprising a depth measurement mechanism, as described elsewhere herein;
- the wide field of view camera is stereoscopic and comprises one or more pairs of cameras, as described elsewhere herein;
- in this case, optionally for a wide field of view camera with multiple cameras pointing in different directions but having overlapping fields of view, the cameras are be treated as stereoscopic pairs where their fields of view overlap, as described elsewhere herein;
- the status monitor comprises data relating to the or each contributing camera of the wide field of view camera as intrinsic parameters, as described elsewhere herein;
- the streaming encoder is adapted to assign a main area of interest to the image for streaming, the main area of interest being one selected from the list consisting of a predetermined region of a predetermined primary camera, and a region depicting a user, as described elsewhere herein;
- in this case, optionally the streaming encoder is adapted to encode the image with a highest quality for the main area of interest, and at least a first reduced quality for other regions of the image that would fall within the field of view subsequently displayed to the recipient when centred on the main area of interest, as described elsewhere herein;
- in this case, optionally the streaming encoder is adapted to encode the image with at least a second reduced quality lower than the first reduced quality in regions of the image that would fall outside the field of view subsequently displayed to the recipient when centred on the main area of interest as described elsewhere herein;
- similarly in this case, optionally the streaming encoder is adapted to encode the image with at least a second reduced quality lower than the first reduced quality in regions of the image that would fall outside the field of view subsequently displayed to the recipient when turning their head within a predetermined range of movement, as described elsewhere herein;
- similarly in this case, optionally the streaming encoder is adapted to encode regions outside the main area of interest at a reduced quality but for regions depicting predetermined objects within a predetermined distance of the camera, encode them at a higher quality than the reduced quality, as described elsewhere herein;
- the streaming encoder is adapted to encode the steam for transmission or hosting by a party whose transmission or hosting protocol is not adapted to accommodate the extrinsic data, as described elsewhere herein; and
- the extrinsic parameters are transmitted per streaming frame in a format selected from the list consisting of as a line in the image, and in at least a part of the image as one or more least significant bits that is preserved by at least one streaming or hosting option of a party transmitting or hosting the stream, as described elsewhere herein.

Figure 5:
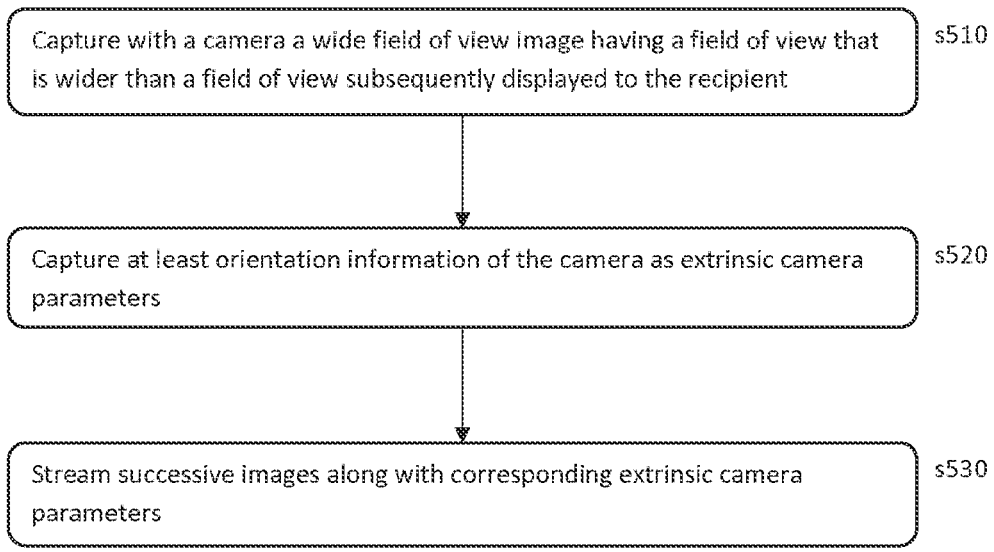
FIG. 5 is a flow diagram of a method of transmitting a virtual reality stream in accordance with embodiments of the present description.

Turning now to FIG. 5, in a corresponding summary embodiment a method of transmitting a virtual reality stream comprises the following: in a first step s510, capturing with a camera a wide field of view image having a field of view that is wider than a field of view subsequently displayed to the recipient, as described elsewhere herein; in a second step s520, capturing at least orientation information of the camera as extrinsic camera parameters, as described elsewhere herein; and in a third step s530, streaming successive images along with corresponding extrinsic camera parameters, as described elsewhere herein.

In another summary embodiment of the present description, a receiving virtual reality streaming system (such as the Sony® PlayStation 5® (PS5), suitable adapted) comprises a receiver (such as Data Port 60 or AV port 90) adapted to receive a stream (e.g. via a network 200 such as the internet, typically via the transmitting virtual reality streaming system summarised above and/or as described elsewhere herein) comprising a series of images captured by a wide field of view camera, and at least orientation information (and optionally position information) of the wide field of view camera as extrinsic camera parameters, a head mounted display 'HMD' 120 having a field of view smaller than that of the wide field of view camera, the head mounted display comprising an inertial measurement unit operably to indicate at least the orientation (and optionally position information) of the head mounted display and a display alignment processor (e.g. CPU 20 suitably adapted by software instruction), wherein the images captured by the wide field of view camera respectively comprise a predetermined main area of interest, and the display alignment processor is adapted to align the main area of interest in the received images with a viewpoint corresponding to a predetermined orientation of the HMD, based at least on the received orientation information of the camera and the indicated orientation of the HMD, and display the result on the HMD, as described elsewhere herein.

Instances of this summary embodiment implementing the methods and techniques described herein (for example by use of suitable software instruction) are envisaged within the scope of the application, including but not limited to that:
- the received extrinsic camera parameters further comprise position information, and the display alignment processor is adapted to estimate from the received extrinsic camera parameters a motion of the wide field of view camera when capturing the streamed images, and compensate for the movement to select a subset of the received image to display within the field of view of the HMD, as described elsewhere herein.

It will be appreciated that if the camera is static and does not move position, then optionally position data is not necessary and the receiving virtual reality system can assume the HMD and the wide field of view camera are static and coincident, with only the orientation to account for. As noted above, position information optionally be included, and consequently if the camera is moves, then the position information can optionally be used to compensate for the movement or at least optionally for small or repetitive vibrations and jolts.

Figure 6:
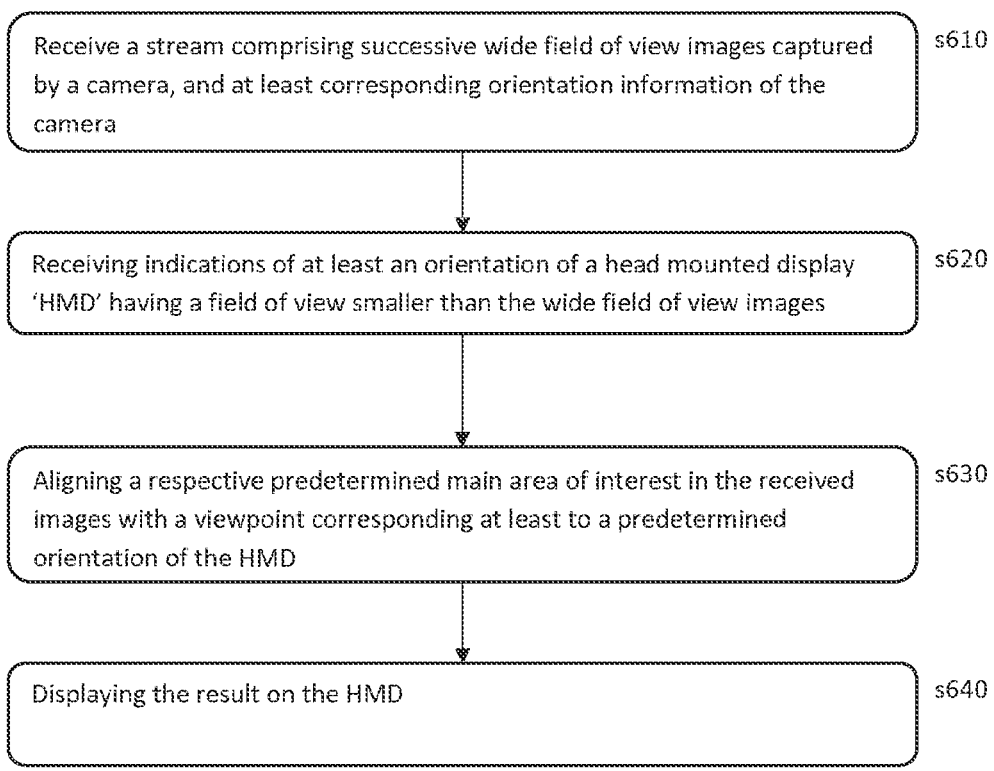
FIG. 6 is a flow diagram of a method of receiving a virtual reality stream in accordance with embodiments of the present description.

Turning now to FIG. 6, in a corresponding summary embodiment a method of receiving a virtual reality stream, comprises the following: in a first step s610, receiving a stream comprising successive wide field of view images captured by a camera, and at least corresponding orientation information of the camera, in a second step s620 receiving indications of at least an orientation of a head mounted display 'HMD' having a field of view smaller than the wide field of view images, in a third step s630 aligning a respective predetermined main area of interest in the received images with a viewpoint corresponding at least to a predetermined orientation of the HMD, based on at least the received orientation information of the camera and the indicated orientation of the HMD, and in a fourth step s640 displaying the result on the HMD, as described elsewhere herein.

In a further summary embodiment, a VR streaming system 10 may be capable of both transmitting and receiving streams as described herein and hence comprise both the transmitting virtual reality streaming system and the receiving virtual reality streaming system described in the above summary embodiments and/or as elsewhere herein.

As described elsewhere herein, a wide field of view may be defined as a field of view that is wider than the field of view subsequently displayed to the recipient. Whilst it has been assumed herein that the subsequent field of view is due to a hardware limit of the HMD or other viewing device, this is not necessarily the case; if the viewing device has a comparable or larger field of view than the wide field of view camera, the streamed image can still be displayed, but in this case the field of view may be artificially constrained either by the use of margins overlaid on a peripheral of the image, or by scaling the size of the image (digital zoom) by a predetermined amount so that the view again exceeds the display field of view.

It will be appreciated that the methods described herein may be carried out on hardware suitably adapted as applicable by software instruction or by the inclusion or substitution of dedicated hardware.

Thus the required adaptation to existing parts of a device such as a PlayStation 5 may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A transmitting virtual reality streaming system, comprising:
   a wide field of view camera having a field of view that is wider than a field of view subsequently displayed to a recipient,
   the wide field of view camera comprising in turn: (i) one or more contributing cameras; and (ii) a status monitor, and
   the status monitor comprising in turn: (i) an inertial measurement unit operable to capture at least orientation information of the wide field of view camera as extrinsic camera parameters; and (ii) a streaming encoder adapted to stream successive images along with corresponding extrinsic camera parameters, wherein the streaming encoder is adapted to encode the images for transmission or hosting by a party whose transmission or hosting protocol is not adapted to accommodate the extrinsic camera parameters.

2. The transmitting virtual reality streaming system of claim 1, wherein the one or more contributing cameras may comprise depth cameras comprising a depth measurement mechanism.

3. The transmitting virtual reality streaming system of claim 1, wherein the wide field of view camera is stereoscopic and comprises one or more pairs of cameras.

4. The transmitting virtual reality streaming system of claim 3, wherein for a wide field of view camera with multiple cameras pointing in different directions but having overlapping fields of view, the cameras are treated as stereoscopic pairs where their fields of view overlap.

5. The transmitting virtual reality streaming system of claim 1, wherein the status monitor comprises data relating to the one or more contributing cameras as intrinsic parameters; and
   the streaming encoder includes the intrinsic parameters at least once in the stream.

6. The transmitting virtual reality streaming system of claim 1, wherein the streaming encoder is adapted to assign a main area of interest to the images, the main area of interest being one of:
   i. a predetermined region of a predetermined primary camera, and
   ii. a region depicting a user.

7. The transmitting virtual reality streaming system of claim 6, wherein the streaming encoder is adapted to encode the images with a highest quality for the main area of interest, and at least a first reduced quality for other regions of the images that would fall within the field of view subsequently displayed to the recipient when centred on the main area of interest.

8. The transmitting virtual reality streaming system of claim 7, wherein the streaming encoder is adapted to encode the images with at least a second reduced quality lower than the first reduced quality in regions of the images that would fall outside the field of view subsequently displayed to the recipient when centred on the main area of interest.

9. The transmitting virtual reality streaming system of claim 7, wherein the streaming encoder is adapted to encode the images with at least a second reduced quality lower than the first reduced quality in regions of the images that would fall outside the field of view subsequently displayed to the recipient when turning their head within a predetermined range of movement.

10. The transmitting virtual reality streaming system of claim 7, wherein the streaming encoder is adapted to encode regions outside the main area of interest at a reduced quality but for regions depicting predetermined objects within a predetermined distance of the wide field of view camera, encode them at a higher quality than the reduced quality.

11. The transmitting virtual reality streaming system of claim 1, wherein the extrinsic camera parameters are transmitted per streaming frame in a format, which is one of:
as a line in the images; and
in at least a part of the images as one or more least significant bits that is preserved by at least one streaming or hosting option of a party transmitting or hosting the stream.

12. A receiving virtual reality streaming system, comprising:
a receiver adapted to receive a stream comprising a series of images captured by a wide field of view camera, and at least orientation information of the wide field of view camera as extrinsic camera parameters, wherein the series of images are received from a streaming encoder adapted to encode the series of images for transmission or hosting by a party whose transmission or hosting protocol is not adapted to accommodate the extrinsic camera parameters;
a head mounted display 'HMD' having a field of view smaller than that of the wide field of view camera, the HMD comprising an inertial measurement unit operably to indicate at least an orientation of the HMD; and
a display alignment processor; wherein
the images captured by the wide field of view camera respectively comprise a predetermined main area of interest; and
the display alignment processor is adapted to align the predetermined main area of interest in the images with a viewpoint corresponding to a predetermined orientation of the HMD, based at least on the orientation information of the wide field of view camera and the predetermined orientation of the HMD, and display the images on the HMD.

13. The receiving virtual reality streaming system of claim 12, wherein:
the extrinsic camera parameters further comprise position information; and the display alignment processor is adapted to:
estimate from the extrinsic camera parameters a motion of the wide field of view camera when capturing the images; and
compensate for the motion to select a subset of the series of images to display within the field of view of the HMD.

14. A VR streaming system comprising:
a transmitting virtual reality streaming system, including:
a wide field of view camera having a field of view that is wider than a field of view subsequently displayed to a recipient, the wide field of view camera comprising in turn: (i) one or more contributing cameras; and (ii) a status monitor, and the status monitor comprising in turn: (i) an inertial measurement unit operable to capture at least orientation information of the wide field of view camera as extrinsic camera parameters; and (ii) a streaming encoder adapted to stream successive images along with corresponding extrinsic camera parameters, wherein the images are received from a streaming encoder adapted to encode the images for transmission or hosting by a party whose transmission or hosting protocol is not adapted to accommodate the extrinsic camera parameters; and
a receiving virtual reality streaming system, including: a receiver adapted to receive a stream comprising a series of images captured by a wide field of view camera, and at least orientation information of the wide field of view camera as extrinsic camera parameters; a head mounted display 'HMD' having a field of view smaller than that of the wide field of view camera, the HMD comprising an inertial measurement unit operably to indicate at least an orientation of the HMD; and a display alignment processor; wherein (i) the images captured by the wide field of view camera respectively comprise a predetermined main area of interest; and (ii) the display alignment processor is adapted to align the predetermined main area of interest in the images with a viewpoint corresponding to a predetermined orientation of the HMD, based at least on the orientation information of the wide field of view camera and the predetermined orientation of the HMD, and display the images on the HMD.

15. A method of transmitting a virtual reality stream, comprising the steps of:
capturing with a camera a wide field of view image having a field of view that is wider than a field of view subsequently displayed to a recipient,
capturing at least orientation information of the camera as extrinsic camera parameters; and
streaming successive images along with corresponding extrinsic camera parameters, wherein the images are streamed by a streaming encoder adapted to encode the images for transmission or hosting by a party whose transmission or hosting protocol is not adapted to accommodate the extrinsic camera parameters.

16. A method of receiving a virtual reality stream, comprising the steps of:
receiving a stream comprising successive wide field of view images captured by a camera, wherein the stream is received from a streaming encoder adapted to encode the stream for transmission or hosting by a party whose transmission or hosting protocol is not adapted to accommodate extrinsic camera parameters of the camera,
and at least corresponding orientation information of the camera;
receiving indications of at least an orientation of a head mounted display 'HMD' having a field of view smaller than the wide field of view images;
aligning a respective predetermined main area of interest in the images with a viewpoint corresponding at least to a predetermined orientation of the HMD, based on at least the orientation information of the camera and the predetermined orientation of the HMD; and
displaying the images on the HMD.

17. A non-transitory, computer readable storage medium containing a computer program comprising computer executable instructions adapted to cause a computer system to perform a method of transmitting a virtual reality stream, comprising the steps of:

capturing with a camera a wide field of view image having a field of view that is wider than a field of view subsequently displayed to a recipient, capturing at least orientation information of the camera as extrinsic camera parameters; and streaming successive images along with corresponding extrinsic camera parameters, wherein the images are streamed by a streaming encoder adapted to encode the images for transmission or hosting by a party whose transmission or hosting protocol is not adapted to accommodate the extrinsic camera parameters.

18. A non-transitory, computer readable storage medium containing a computer program comprising computer executable instructions adapted to cause a computer system to perform a method of receiving a virtual reality stream, comprising the steps of:

receiving a stream comprising successive wide field of view images captured by a camera, and at least corresponding orientation information of the camera, wherein the stream is received from a streaming encoder adapted to encode the images for transmission or hosting by a party whose transmission or hosting protocol is not adapted to accommodate extrinsic camera parameters of the camera;

receiving indications of at least an orientation of a head mounted display 'HMD' having a field of view smaller than the wide field of view images;

aligning a respective predetermined main area of interest in the images with a viewpoint corresponding at least to a predetermined orientation of the HMD, based on at least the orientation information of the camera and the predetermined orientation of the HMD; and displaying the images on the HMD.

* * * * *